(12) United States Patent
Meiler et al.

(10) Patent No.: US 7,326,894 B2
(45) Date of Patent: Feb. 5, 2008

(54) HEATING ELEMENT ON THE POLYMER INSIDE SURFACE OF A MOTOR VEHICLE FRONT-END MODULE/BUMPER IN AN OPERATIVE CONNECTION TO A RADAR TRANSMITTER/RECEIVER UNIT

(75) Inventors: Matthias Meiler, Neugattendorf (DE); Edgar Quandt, Gattendorf (DE); Marcel Auer, Bern (CH); Ernst Opel, Schwarzenbach (DE)

(73) Assignee: Rehau AG & Co., Rehau (DE)

( * ) Notice: Subject to any disclaimer, the term of this patent is extended or adjusted under 35 U.S.C. 154(b) by 110 days.

(21) Appl. No.: 11/245,009

(22) Filed: Oct. 7, 2005

(65) Prior Publication Data

US 2006/0086710 A1   Apr. 27, 2006

(30) Foreign Application Priority Data

Oct. 7, 2004    (DE) ...................... 10 2004 049 148

(51) Int. Cl.
*H05B 6/66* (2006.01)
(52) U.S. Cl. ...................... 219/695; 219/704; 219/663; 296/193.1

(58) Field of Classification Search ................ 219/695, 219/704, 663, 665; 385/14, 1, 2, 4, 8, 15, 385/31, 129, 130; 296/193.1, 193.09
See application file for complete search history.

(56) References Cited

U.S. PATENT DOCUMENTS

| 6,539,137 B1 * | 3/2003 | Moresco et al. ............... 385/14 |
| 7,011,360 B2 * | 3/2006 | Lanard et al. ........... 296/193.1 |

\* cited by examiner

*Primary Examiner*—Quang Van
(74) *Attorney, Agent, or Firm*—Venable LLP; Robert Kinberg; Steven J. Schwarz

(57) ABSTRACT

A heating element for an inside surface of a front-end module/bumper for a motor vehicle. The heating element is operatively connected to a radar transmitting/receiving unit. The heating element includes a heating film formed of a polymer, an array of conductor strips integrated into the heating film, and an electronic control element that controls the conductor strips. The array of conductor strips is divided into an inner region through which a radar beam from the radar transmitting/receiving unit is transmitted, and an outer region through which the radar beam is not transmitted. The conductor strips in the inner region are inclined by angles of about 45° to about 90° relative to a polarization plane of the radar beam. The conductor strips in the outer region are arranged in a meandering pattern.

20 Claims, 3 Drawing Sheets

HEATING ELEMENT ON THE POLYMER INSIDE SURFACE OF A MOTOR VEHICLE FRONT-END MODULE/BUMPER IN AN OPERATIVE CONNECTION TO A RADAR TRANSMITTER/RECEIVER UNIT

CROSS-REFERENCE TO RELATED APPLICATIONS

This application claims the priority of German Patent Application No. 10 2004 049 148.8, filed on Oct. 7, 2004, the entire content of which is incorporated herein by reference.

BACKGROUND OF THE INVENTION

It is known from the prior art to make outer body shells for motor vehicles out of polymers. Outer body shells of this type are used, for example, as bumpers or front-end modules. The bumpers and/or front-end modules may have built-in functionalities, such as distance sensors, lighting means, license plate holders, or the like. In the coming years, it is expected that integrated radar transmitting/receiving units, in particular, will be used increasingly in motor vehicles for the detection of objects and/or pedestrians.

Depending on the installation constraints of the particular motor vehicle, the location for mounting such radar transmitting/receiving units can differ. Different types of mounting arrangements are known from the prior art.

It is advantageous to install the radar transmitting/receiving units behind a bumper, using a suitable mounting device. In this location, the radar sensor is protected from rocks and other debris. In addition, this location conceals the radar sensor, so that the ever important external appearance of the vehicles front-end is not adversely affected. Presently, different options for mounting radar sensors in the front-end of a motor vehicle are being tested, for example, behind the radiator grill or behind the license plate holder. For this type of mounting, the radar sensors are typically encapsulated or placed inside holding devices, so that the radar sensor arrangement and its associated circuitry is not subjected directly to environmental factors such as rain, snow, or wet/cold weather.

Holding devices of the aforementioned type have the disadvantage that the characteristics of the radar beam change as a result of weather conditions, such as moisture, ice or snow, potentially limiting object detection in the area in front of the vehicle. The article entitled "Autonomous Driving Approaches Downtown," published in IEEE Intelligent Systems, Vol. 13, No. 6, in 1999, describes optical- or radar-based image-detection systems for motor vehicles which achieve a visualization of the objects (pedestrians, houses, vehicles, traffic signs, etc.).

In the publication VDI Kongress Berlin, September 2001, entitled "AKTIV-REVERSIBLE SCHUTZKONZEPTE ZUR ERFÜLLUNG DER FUSSGÄNGER-SCHUTZANFORDERUNGEN NACH EEVC WG 17" (in English, "Active Reversible Protection Concepts to Meet the Requirements of Protecting Pedestrians under EEVG WG 17"), the link between radar sensor object detection and the use of active pedestrian protection is disclosed. In addition, a generic test device is demonstrated that leads to the configuration of different sensor systems for an active-reversible protection concept. In particular, this reference discusses the use of so-called pre-crash sensors in connection with contact-film sensors, mounted on the outer shell of a front or rear bumper, which function to activate a pedestrian protection system. These concepts have the disadvantage that weather conditions such as snow, ice, or rain/wetness can influence the object image resolution of the radar signals, thereby preventing activation of the pedestrian protection in case of a threatening collision with a pedestrian. It is also known that weather conditions influence the radar signal characteristic and, within the framework of a subsequent dynamic image analysis, can lead to incorrect information concerning the area/zone to be scanned in front of the motor vehicle. As a result, the radar sensor detection as well as object detection are negatively influenced during weather conditions in which reliable operation of the device is absolutely necessary, for example, icy rain.

The publication "WERKZEUGE UND TESTVERFAHREN ZUR ENT-WICKLUNG UND ANALYSE VON ACC-SYSTEMEN" (in English, "Tools and Test Methods For Developing and Analyzing Adaptive Cruise Control (ACC) Systems"), Aachen Colloquium "FAHRZEUG UND MOTORENTECHNIK 2000" (in English "Vehicle and Motor Technology 2000"), lists test requirements for radar-based adaptive cruise control (ACC) sensor systems that are designed to be resistant to the influence of adverse weather conditions.

The use of radar-based ACC systems together with an intelligent speed control leads to the integration of the radar sensor unit and the transmitter/receiver module (TRM). The TRM modules are often made using MMIC technology, meaning silicon-based monolithic integrated microwave circuits. As compared to common Gunn diode technology, MMIC technology has the advantage of a higher component density for the installation and dismantling, as well as compatibility with additional adaptive sensor devices. The aforementioned radar sensors with integrated evaluation units are also affected by adverse weather conditions, which can result in signal attenuation/distortion. For example, radar-signal attenuation can be caused by icing up of the frontal region of the motor vehicle, in connection with dirt particles being embedded in the ice. The signal attenuation/distortion has a significant negative effect on the desired and/or required object detection and identification in a zone of approximately 100 m in front of the vehicle, for example, when using long-range radar (LRR). LRR operates with a frequency-modulated continuous wave radar technology (FMCW radar technology), with a linear modulated radar wave, in the frequency range of 76-78 GHz. Presently, hidden installation in a motor vehicle is realized by using a cover.

SUMMARY OF THE INVENTION

It is an object of the present invention to provide a heating element which improves the transmissibility of radar-beam transmission for radar transmitting and receiving units during adverse weather conditions, thus increasing the reliability of the radar-controlled sensor arrangement. It is also an object of the present invention to provide a corresponding heating element array for a radar receiving and transmitting unit mounted in the front-end module of a motor vehicle.

According to one exemplary embodiment, the present invention relates to a heating element for an inside surface of a polymeric front-end module/bumper for a motor vehicle, the heating element being operatively connected to a radar transmitting/receiving unit. The heating element comprises a heating film formed of at least one of the polymers selected from the group consisting of polycarbonate, polybutylene terephthalate, and cross-linked polyethylene, the heating film having a thickness in the range of about 0.1 to about 0.3 mm; an array of conductor strips integrated into the polymer heating film, the conductor strips having widths in the range of about 0.4 to about 2 mm, the array of conductor strips being divided into an inner region through which a radar beam from the radar transmitting/receiving unit is transmitted, and an outer region through which the radar beam is not transmitted; an electronic control element that controls when the conductor strips heat up the heating film; and connecting pads and an electric circuit adapted to connect the conductor strips and the electronic control element to a power supply of the motor vehicle; wherein the conductor strips in the inner region are uniformly spaced apart at distances ranging from about 2.8 to about 6 mm and are inclined by angles of about 45° to about 90° relative to a polarization plane of the radar beam, and the conductor strips in the outer region are arranged in a meandering pattern and are spaced apart at distances ranging from about 1 to about 6 mm; further wherein a heating output in the range of about 10 to about 150 watts is supplied from the vehicle power supply to the conductor strips, the heating output being electronically controlled by the electronic control element.

According to another exemplary embodiment, the present invention relates to an array of the heating elements, wherein the array is operatively connected to a radar transmitting/receiving unit, and is arranged on the inside surface of a polymeric front-end module/bumper for a motor vehicle.

Under adverse weather conditions, a polymer heating film mounted on the inside of a front-end module/bumper and operatively connected to the radar transmitting/receiving unit can improve the radiation characteristic of the radar signals. In particular, the polymer heating film prevents icing up of the radar sensor unit.

The heating film used in accordance with the present invention can be composed of polycarbonate (PC), or polybutylene terephthalate (PBT), and/or a cross-linked polyethylene (PE-X). The heating film can include integrated heat conductor strips formed by a screen printing method. In addition, the heating film can be made of a material adapted to the polymer material for the front-end module/bumper with license-plate holder.

The heating film can have a thickness of approximately 0.1 to 0.3 mm, depending on the design. The width of a heat conductor strip can range from approximately 0.4 to 2 mm, and the total resistance of the conductor strip array can range from approximately 4 to 12 ohms. According to one aspect of the invention, arranging the conductor strips at an angle of approximately 45° to 90°, perpendicular to the polarization of the radar transmitting/receiving beam, can result in improved radar transmitting and receiving characteristics. In particular, the values relevant for radar, such as the width of the horizontal and vertical radar lobes, their position, and the signal-to-noise ratio, are not significantly influenced by the conductor strips when they are arranged at an angle of approximately 45° to 90°. Adjacent heat conductor strips can be spaced apart in the radar transmission direction at distances ranging from approximately 2.8 to 6 mm. As a result, radar diffraction phenomena caused by the heat conductor strips can be ruled out for the frequency range of 76 to 78 GHz.

According to another aspect of the invention, the complete heating film can be divided into an inner region and an outer region. The inner region can consist of uniformly spaced apart conductor strips, at distances of 2.8 mm to 6 mm, which are arranged at an angle of 45° to 90° and perpendicular to the radar polarization axis. The conductor strips can be spaced closer together in the outer region, where no radar-beam transmission occurs.

The inner and outer regions of the heating film can be connected to the motor vehicle's electrical supply system by connecting pads and conventional electrical connecting means. Additionally or alternatively, the connections can be made via an intermediate control element, e.g. a positive temperature coefficient (PTC) or negative temperature coefficient (NTC), element in connection with a thermistor circuit for limiting electrical power. The heating capacity of the heating film can be configured over the length of the conductor strips in the inner and outer region, e.g., by adjusting their resistance, such that the ratio of outer region heating capacity to inner region heating capacity is between 3:1 and 1.05:1. As a result, it can be ensured that the heating output is higher in the edge region of the heating film, where surface contact, e.g. to the cold zones of a bumper system in winter, requires a higher heating capacity than the inner region. This arrangement also ensures that the outer region is designed as a zone with increased heating output, while the inner region of the heating film, in the area of radar-beam transmission, is provided with conductor strips that are spaced apart to meet the requirements for preventing radar-beam interference. The conductor strips can be oriented relative to the polarized radar beam axis at an angle of 45° to 90°, wherein this conductor strip arrangement in the inner region does not disrupt the radar signal path/cause interference.

An electronic control element can be connected to the heating film. The electronic control element can be designed such that a defined start-up point for the heating can be adjusted by the heating film. Temperature range intervals that are adapted to the outside temperature, for example ranging from −15° to +15°, can be selected freely and can be preset in accordance with external conditions.

PTC and/or NTC elements are preferably used as electronic control elements because they exhibit a good electronic activation characteristic. This allows the area of the heating film through which the radar beam is transmitted, for example, the inner heating zone, to be free of ice shortly after driving starts. The low electrical power consumption of PTC or NTC elements in connection with the heating film also results in low electric power consumption during the cold time of the year. The connection to the vehicle power supply in this case can also be via conventional electrical connector assembly.

To reduce the required heating capacity of the heating film, it may be advantageous to use an additional covering film of foamed polyethylene or polypropylene, or cross-linked polypropylene, with a layer thickness ranging from approximately 1 to 1.5 mm.

The additional covering film can be coated on the inside, meaning the side facing the conductor strips in the heating film, with silicon oxide (SiO) and/or silicon nitride (SiN) and/or silicon oxinitride (SiON). The SiO and/or SiN and/or SiON coating has the advantage that by selecting a suitable thickness for these layers or the layer sequence, the heat radiation generated by means of the heating film (within the meaning of a heat-reflection coating) is thus kept on the inside of the sandwich-type arrangement (heating film and covering film). As a result, heat losses during extremely cold conditions are advantageously reduced. The coated covering film can be applied cheaply to the heating film by gluing it on in a conventional manner. The use of SiO and/or SiN and/or SiON coatings applied to the covering film further protects the heating film against heat losses and mechanical damage. A short-circuit caused by mechanical damage can also be prevented, thereby increasing the service life of the heating film. The additional layer sequence (SiO, SiN, SiON layer) furthermore has the advantage that only a minimum attenuation of the radar transmitting and receiving signal occurs in the transmitting frequency range of 76-78 GHz, wherein the SiO and/or SiN and/or SiON layers are advantageously deposited with a layer thickness ranging from 300 to 900 μm.

The covering film additionally has the advantage of preventing contaminated water from entering the heating film, and/or salt water from drying on the heating film as a result of the heat generated by the heating film during operation. To further minimize the amount of contaminated water or salt water that can reach the heating film surface, the combined heating film/covering film/inside coating can be sealed along the edges, for example, with varnish, sealing paste, sealing foam, or hot-melt glue.

The heating film according to the invention can thus be mounted on the inside of a front-end module/bumper made from a polymer material. For example, the heating film can be located in the region of the license plate holder. The total thickness of the polymer materials used, including the heating film, the covering film and coating, and the front-end module/bumper, can be in the range of 2.2 to 3.8 mm, with a radar beam attenuation from 0.4 to 2 dB per unit of area.

Tests performed with different polymer front-end module/bumper materials, including a polycarbonate-polybutylene terephthalate material mixture (PC-PBT material mixture) and/or a polypropylene-ethylene-propylene-dien-monomer material mixture (PP-EPDM mixture), resulted in excellent radar transmitting and receiving characteristics for the combination heating film and covering film.

Simulated exposure experiments were carried out inside a climate chamber at minus 10° C. with the heating film and the covering film mounted on the inside of a front-end module/bumper operatively connected to the radar transmitting and receiving unit. The experiments showed that the iced-up areas in the region of the license-plate holder were thawed out within a very short time using heating capacities of, for example, 10 to 150 watts. As a result, it was possible to restore the radar-sensor operation in cold and unpleasant weather conditions. Even the use of a heating film with a heat-insulating layer of SiO and/or SiN and/or SiON did not show a significant radar-signal distortion and/or attenuation when operatively connected to the radar transmitting/detecting unit.

According to another aspect of the invention, several heating circuits with a redundant layout can be used. For example, several parallel-connected heating circuits can be used. Such a redundant layout has the advantage of dividing the heating zone, for example, based on the design of the radar transmitting/receiving unit and/or the positioning of the heating film. In case of damage to one heating circuit of the heating film, the remaining heating circuits can continue to function.

The heating film according to the invention and its positioning on the inside of a front-end module/bumper of polymer material, for example in the region of a license-plate holder, and its operative connection to the radar transmitter/detector creates conditions for the radar transmitting and receiving unit that otherwise exist only during the warm seasons. The total capacity of the radar sensor unit is consequently improved for winter-weather conditions, which creates the conditions for a year-around effective operation, for example to reliably ensure the activation of the pedestrian protection system for collision dangers or to maintain the distance to other traffic participants in the area in front of the vehicle during adverse winter-weather conditions.

BRIEF DESCRIPTION OF THE DRAWINGS

These and other features and advantages of the invention will be further understood from the following detailed description of the preferred embodiments with reference to the accompanying drawings in which.

DETAILED DESCRIPTION OF PREFERRED EMBODIMENTS

Figure 1:
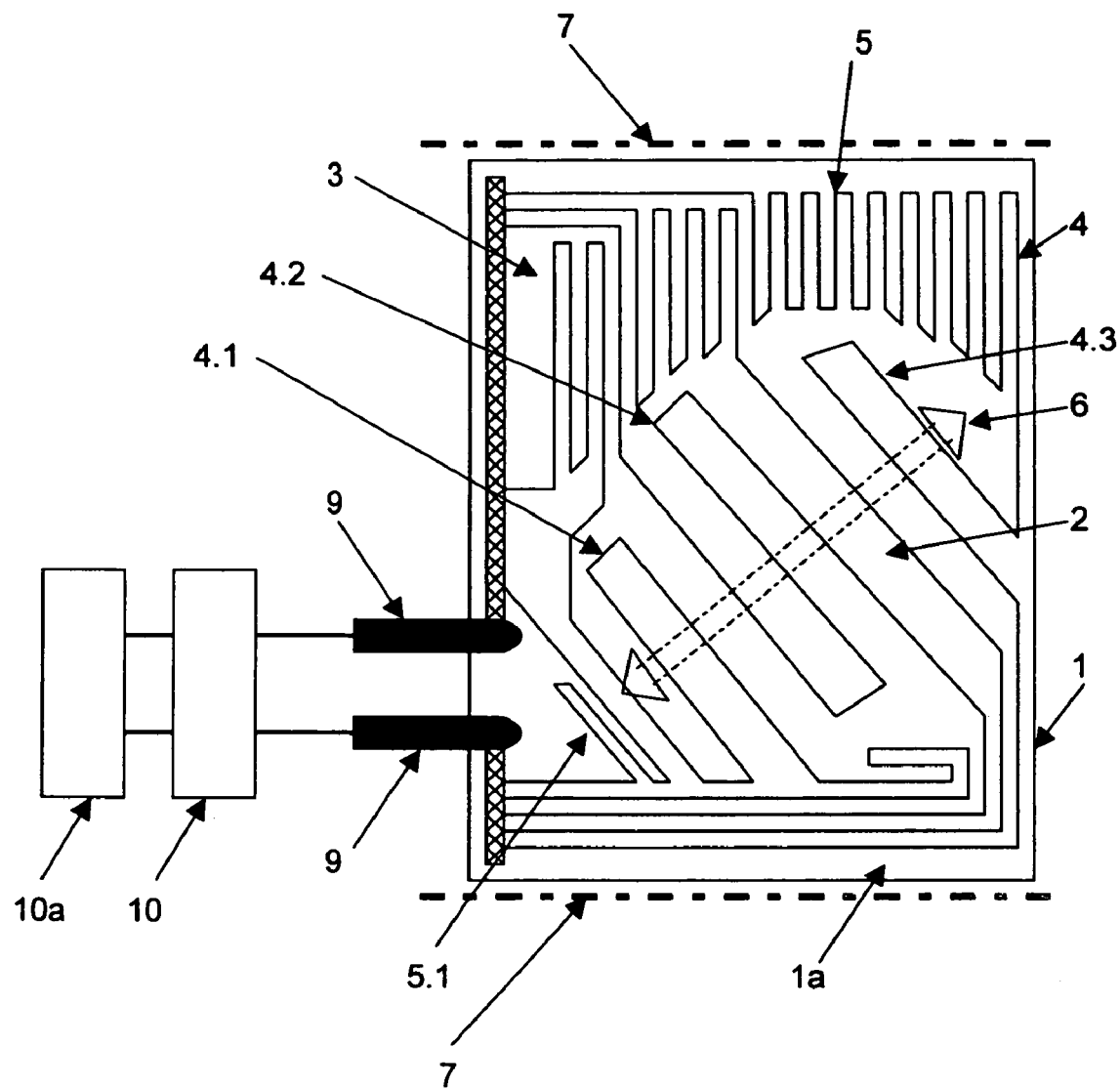
FIG. 1 is a front view of a heating film according to the present invention, the heating film being mounted on the inside of a front-end module/bumper in the region of the license-plate holder.

FIG. 1 shows an exemplary embodiment of a heating film (1) according to the present invention. The heating film (1) comprises an inner region (2) and an outer region (3) as well as associated conductor strips (4, 5). The conductor strips (4) of the inner region (2) are positioned at an angle (ranging from 45° to 90°) relative to the polarization direction of the radar transmitting and receiving beam, indicated by double arrow (6). The heating film (1) can be mounted, for example, on the inside of a front-end module/bumper made of a polymer material. The heating film (1) can be located in the region of the license-plate holder (7). The heating film (1) is operatively connected to a radar transmitting/receiving unit (8), represented schematically in FIG. 3.

Connecting pads (9) are used to connect the conductor strips (4, 5) to the vehicle power supply (10a) via a control element (10). The control element (1) can be a PTC or NTC element. The conductor strips (4) on the inner region (2) are spaced apart from 2.8 to 6 mm. As a result, the polarized radar beam (6) is not diffracted at a frequency of 76-78 GHz. The width of the conductor strips (4) is in the range of 0.4 to 2 mm.

The conductor strip array (4, 4.1, 4.2, 4.3) shown herein can have a redundant layout in the inner region (2) of the heating film (1). This prevents the failure of one of the inner heat conductor strips (4, 4.1, 4.2, 4.3) from completely disrupting the function of the heating film (1). The inner region (2) of the heating film (1) is surrounded by the outer region (3) of the heating film (1). The conductor strips (5, 5.1), located in the outer region (3) are arranged in a meandering shape, and are arranged closer together. As a result, the outer region (3) of the heating film (1) advantageously causes a faster thawing of the license-plate holder (7) in the edge region (3) during adverse ice and snow conditions. In addition, a temperature gradient forms between the inner region (2), through which the radar-beam is transmitted, and the outer region (3). A heat flow is thus generated between the outer region (3) and the inner region (2) as a result of this temperature gradient. This is accompanied by a heating capacity adjustment which is higher by a ratio of approximately 3:1 to 1.05:1 in the region of the outer surface (3) than in the inner region (2). This adjustment can be achieved by making the length of the conductor strips (5, 5.1) for the outer surface (3) longer than the conductor strips (4.1, 4.2 and 4.3) for the inner heating zone (2) by approximately the same ratio. The resistance of the conductor strips (4, 4.1, 4.2, and 4.3) is in the range of 4 to 12 ohms.

The electronic control element (10) determines the heating start-up point, for example, for outside temperatures ranging from −15° C. to +15° C. The electronic control element (10) is electrically connected to the vehicle power supply (10a) by means of a connector assembly, not shown herein.

Also conceivable in this connection is the use of an outside temperature sensor that triggers the electronic control element (10) to control and regulate the heating of the heating film (1). For example, the temperature sensor can be connected to the electronic control element (10) via radio signal or an electronic connection.

Figure 2:
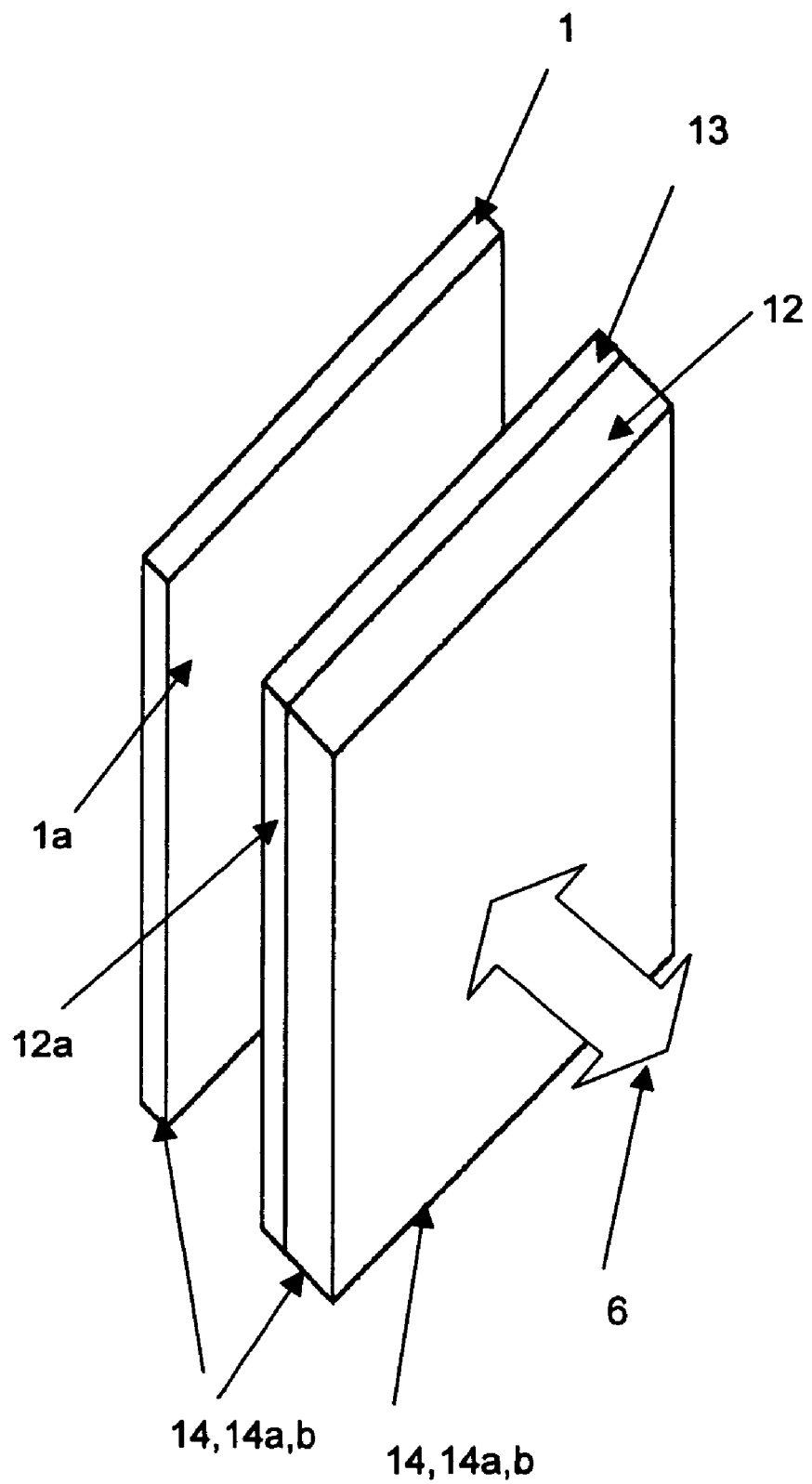
FIG. 2 is a perspective view of a heating film according to the present invention, the heating film including a covering film that is coated on the inside.

FIG. 2 shows an exemplary embodiment of a heating film (1) having an inside-coated covering film (12). Components which correspond to components previously explained with reference to FIG. 1 are given the same reference numbers and will not be discussed again in further detail. The heating film (1) with an inner region (2) and an outer region (3), connecting pads (9), as well as conductor strips (4, 4.1, 4.2, 4.3, 5, and 5.1) can further include an additional covering film (12). Covering film (12) can be a foamed polyethylene, and/or a polypropylene material, and/or a cross-linked polypropylene having a layer thickness in the range of 1 to 1.5 mm. The covering film (12) can be coated on the inside (12a), meaning the side facing the conductor strips (4, 4.1, 4.2, 4.3; 5 and 5.1) of the heating film (1), with a coating (13) of silicon oxide (SiO) and/or silicon nitride (SiN) and/or silicon oxinitride (SiON). The coatings (13) act as heat-reflecting layers, and result in minimal attenuation of the radar transmitting and receiving signal in the transmitting frequency range of 76 to 78 GHz. The coatings (13) can also prevent contaminated water/salt water from reaching the heating film surface (1a). This can be further prevented by sealing along the edges of the combined heating film (1), covering film (12), and coating (13) using a sealing varnish (14a), and/or a sealing paste/foam (14b), and/or a hot-melt glue to form a border (14).

Figure 3:
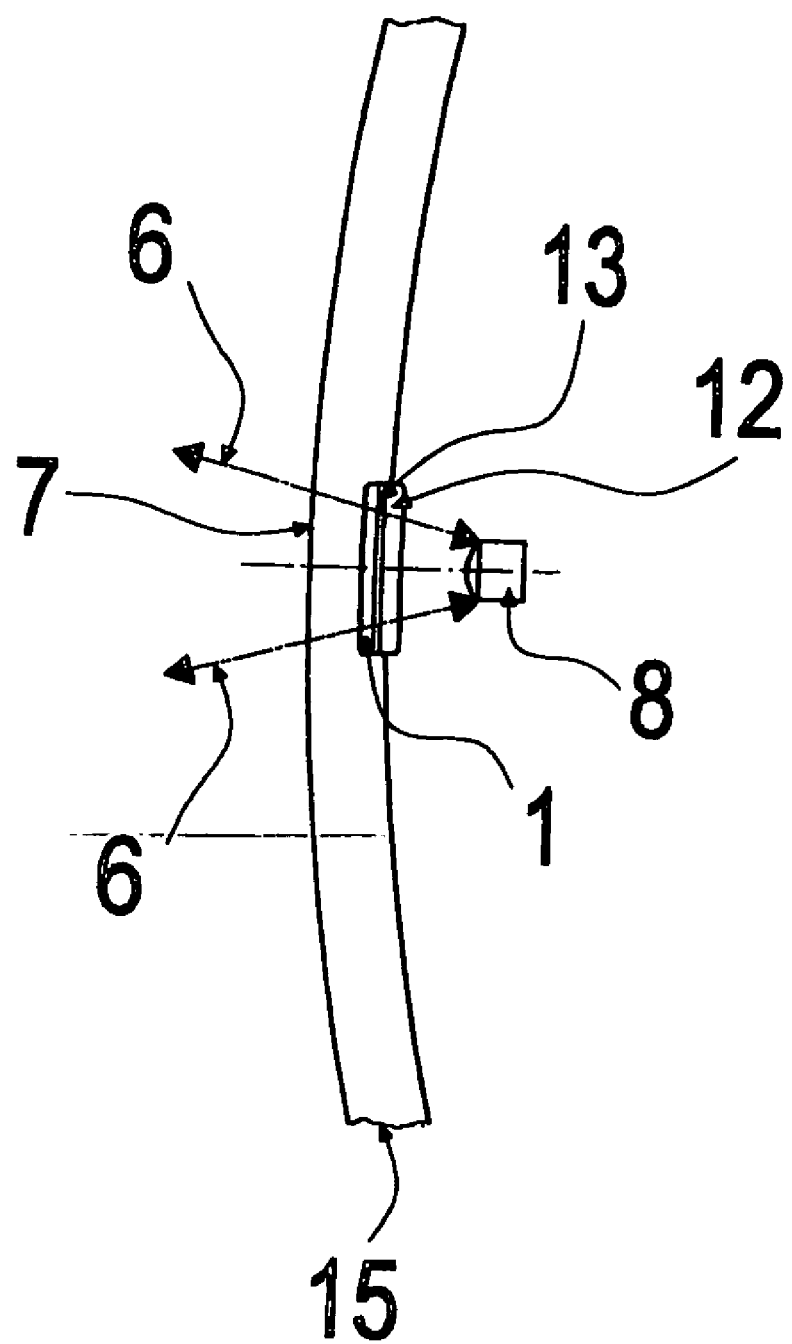
FIG. 3 is a side view of a portion of a front-end module of an automobile, having a heating film according to the present invention mounted thereto in-the region of the license-plate holder.

FIG. 3 shows a segment of a front-end module/bumper system (15) for a motor vehicle. The front-end module/bumper system (15) has a license-plate holder (7). A heating film (1) is attached to the inside of the bumper system (15) in the region of the license-plate holder (7). The heating film (1) is operatively connected to the radar transmitting/receiving unit (8), and includes covering film (12) and coating (13), which are explained above in connection with FIGS. 1 and 2.

The radar transmitting/receiving unit (8) produces the radar signal (6), which is represented in FIG. 3 by an arrow pointing in opposite directions. The radar transmitting beam (6) is a polarized beam that passes through the covering film (12), the coating (13), the heating film (1) in the region of the inner heating zone (2), and subsequently penetrates the outer shell of the front-end module/bumper (15), in the region of the license-plate holder (7). As discussed above, the front-end module/bumper (15) can be constructed from a polymer material. For example, the front-end module/bumper (15) can be composed of a polycarbonate (PC)—polybutylene terephthalate (PBT) material mixture and/or a polypropylene (PP)—ethylene-propylene-dien-monomer (EPDM) material mixture. These material mixtures result in a maximum attenuation of 0.4 to 2 dB per irradiated unit of area in the frequency range of 76-78 GHz when the conductor strip (4, 4.1, 4.2, and 4.3) is positioned at an angle of 45° to 90° in the inner region (2) of the heating film (1).

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A heating element for an inside surface of a polymeric front-end module/bumper for a motor vehicle, the heating element being operatively connected to a radar transmitting/receiving unit, the heating element comprising:
    a heating film formed of at least one of the polymers selected from the group consisting of polycarbonate, polybutylene terephthalate, and cross-linked polyethylene, the heating film having a thickness in the range of about 0.1 to about 0.3 mm;
    an array of conductor strips integrated into the polymer heating film, the conductor strips having widths in the range of about 0.4 to about 2 mm, the array of conductor strips being divided into an inner region through which a radar beam from the radar transmitting/receiving unit is transmitted, and an outer region through which the radar beam is not transmitted;
    an electronic control element that controls when the conductor strips heat up the heating film; and
    connecting pads and an electric circuit adapted to connect the conductor strips and the electronic control element to a power supply of the motor vehicle;
    wherein the conductor strips in the inner region are uniformly spaced apart at distances ranging from about 2.8 to about 6 mm and are inclined by angles of about 45° to about 90° relative to a polarization plane of the radar beam, and the conductor strips in the outer region are arranged in a meandering pattern and are spaced apart at distances ranging from about 1 to about 6 mm;
    further wherein a heating output in the range of about 10 to about 150 watts is supplied from the vehicle power supply to the conductor strips, the heating output being electronically controlled by the electronic control element.

2. The heating element of claim 1, wherein the electronic control element controls the heating output based on the outside temperature, in a temperature interval range of −15° C. to +15° C.

3. The heating element of claim 1, wherein the electronic control element is at least one of a PTC element or a NTC element.

4. The heating element of claim 1, wherein the conductor strips in the outer region are adapted and configured to provide greater heating output than the conductor strips in the inner region.

5. The heating element of claim 1, wherein the heating output of the outer region is between about 1.05 and about 3 times greater than the heating output of the inner region.

6. The heating element of claim 1, wherein the array of conductor strips comprises at least two redundant layers of conductor strips.

7. The heating element of claim 1, further comprising a covering film of foamed polyethylene or polypropylene deposited on the heating film, the covering film having a thickness ranging from about 1 to about 1.5 mm.

8. The heating element of claim 7, further comprising a heat-reflecting coating deposited on an inside surface of the covering film, wherein the inside surface faces the conductor strips.

9. The heating element of claim 8, wherein the heat-reflecting coating includes a layer of at least one of the materials selected from the group consisting of silicon oxide, silicon nitride, and silicon oxinitride.

10. The heating element of claim 8, wherein the heat-reflecting coating has a layer thickness ranging from about 300 to about 900 µm.

11. The heating element of claim 8, further comprising a border that seals the heating film, the covering film, and the heat-reflecting coating along an outer periphery of the heating element, the border comprising at least one of a sealing varnish, a sealing paste, or a hot-melt glue.

12. The heating element of claim 1, wherein the array is operatively connected to a radar transmitting/receiving unit, and is arranged on the inside surface of a polymeric front-end module/bumper for a motor vehicle.

13. The heating element of claim 12, further including a license plate holder located on the polymeric front-end module/bumper, wherein the array is centrally mounted in front of the radar transmitting/receiving unit on the inside surface of the polymeric front-end module/bumper proximate the license plate holder.

14. The heating element of claim 12, wherein:
the front-end module/bumper is composed of at least one of a polycarbonate-polybutylene terephthalate (PC-PBT) material mixture or a polypropylene-ethylene-propylene-dien-monomer (PP-EPDM) material mixture;
the front-end module/bumper has a total thickness of between about 2.2 and about 3.8 mm; and
attenuation of the radar transmitting/receiving signal ranges from about 0.4 to about 2 dB in a transmitting frequency range of about 76 to about 78 GHz.

15. A heating element for an inside surface of a front-end module/bumper for a motor vehicle, the heating element being operatively connected to a radar transmitting/receiving unit, the heating element comprising:
a heating film formed of a polymer;
an array of conductor strips integrated into the heating film, the array of conductor strips being divided into an inner region through which a radar beam from the radar transmitting/receiving unit is transmitted, and an outer region through which the radar beam is not transmitted; and
an electronic control element that controls the conductor strips;
wherein the conductor strips in the inner region are inclined by angles of about 45° to about 90° relative to a polarization plane of the radar beam, and the conductor strips in the outer region are arranged in a meandering pattern.

16. The heating element of claim 15, wherein the electronic control element is at least one of a PTC element or a NTC element.

17. The heating element of claim 15, wherein the conductor strips in the outer region are adapted and configured to provide greater heating output than the conductor strips in the inner region.

18. The heating element of claim 15, wherein the array of conductor strips comprises at least two redundant layers of conductor strips.

19. The heating element of claim 15, further comprising a covering film of at least one of a foamed polyethylene or polypropylene deposited on the heating film.

20. The heating element of claim 19, further comprising a a heat-reflecting coating deposited on an inside surface of the covering film, wherein the inside surface faces the conductor strips.

* * * * *